(12) United States Patent
Lee

(10) Patent No.: US 6,892,330 B2
(45) Date of Patent: May 10, 2005

(54) CROSS-PLATFORM SYSTEM-FAULT WARNING SYSTEM AND METHOD

(75) Inventor: Jen-Fu Lee, Taipei (TW)

(73) Assignee: Inventec Corporation (TW)

( * ) Notice: Subject to any disclaimer, the term of this patent is extended or adjusted under 35 U.S.C. 154(b) by 456 days.

(21) Appl. No.: 09/996,204

(22) Filed: Nov. 28, 2001

(65) Prior Publication Data

US 2003/0101385 A1 May 29, 2003

(51) Int. Cl.$^7$ ............................................. G06F 11/00
(52) U.S. Cl. ................... 714/48; 714/4; 714/25
(58) Field of Search ....................... 714/57, 4, 48, 714/25, 26, 27

(56) References Cited

U.S. PATENT DOCUMENTS

| | | | | |
|---|---|---|---|---|
| 5,708,775 | A | * | 1/1998 | Nakamura .................... 714/48 |
| 6,006,016 | A | * | 12/1999 | Faigon et al. ................. 714/48 |
| 6,401,217 | B1 | * | 6/2002 | Clark et al. ................... 714/20 |
| 6,557,122 | B1 | * | 4/2003 | Sugauchi et al. ............. 714/57 |
| 6,615,376 | B1 | * | 9/2003 | Olin et al. ..................... 714/57 |
| 6,622,266 | B1 | * | 9/2003 | Goddard et al. .............. 714/44 |
| 6,684,265 | B2 | * | 1/2004 | Graf ............................ 710/18 |
| 6,718,489 | B1 | * | 4/2004 | Lee et al. ..................... 714/43 |
| 2002/0184589 | A1 | * | 12/2002 | Eatough et al. ............. 714/746 |
| 2003/0051191 | A1 | * | 3/2003 | Circenis et al. .............. 714/25 |
| 2003/0061007 | A1 | * | 3/2003 | Sigl ........................... 702/185 |

* cited by examiner

Primary Examiner—Robert Beausoliel
Assistant Examiner—Yolanda L Wilson
(74) Attorney, Agent, or Firm—Peter F. Corless; Steven M. Jensen; Edwards & Angell, LLP

(57) ABSTRACT

A cross-platform system-fault warning system and method is proposed, which is designed for use with a cluster of various kinds of server platforms in a network system for generating a warning message in the event that any one of the server platforms has an abnormal operating condition, such as program execution failure or insufficient hard disk space, so as to inform network administrators and users to take necessary maintenance or precautious actions. The proposed cross-platform system-fault warning system and method utilizes a plurality of fault detection modules, each of which is integrated in one of the server platforms for detecting whether the associated one of the server platforms has an abnormal operating condition, and if yes, capable of generating and transferring a text-based system-fault indicating file to a warning-message database, which stores a mapping table of warning messages toward system-fault indicating files, and which is capable of retrieving the corresponding warning message mapped to the received system-fault indicating file. The warning-message database then transfers the retrieved warning message to a warning-message sender, such as an e-mail server, for transferring the warning message in e-mail via the network system to all the network administrators' and users' workstations, thereby informing all the network administrators and users to take necessary maintenance or precautious actions.

8 Claims, 2 Drawing Sheets

CROSS-PLATFORM SYSTEM-FAULT WARNING SYSTEM AND METHOD

BACKGROUND OF THE INVENTION

1. Field of the Invention

This invention relates to computer network technology, and more particularly, to a cross-platform system-fault warning system and method, which is designed for use with a cluster of various kinds of server platforms in a network system, for generating a warning message in the event that any one of the server platforms has an abnormal operating condition, such as program execution failure or insufficient hard disk space, so as to inform network administrators and users to take necessary maintenance or precautious actions.

2. Description of Related Art

Servers are used in a network system to control network access and serve up applications or data to the users. There are various kinds of servers, including, for example, Web servers, file servers, FTP (File Transfer Protocol) servers, e-mail servers, application servers, database servers, and so on.

A company's internal network system is typically composed of a cluster of various kinds of server platforms running different operating systems. For example, the server cluster may include an Oracle database server, a SQL (Structured Query Language) database server, a UNIX server 13, an AS/400 server, an I2 engine server, a SAP server, a Web server, an EDI (Electronic Data Interchange) server, and so on.

During operation of each individual server platform, if an abnormal operating condition, such as program execution failure or insufficient hard disk space, occurs, it will generate either an error-log file or an alert file (hereinafter collectively referred to as "system-fault indicating file") to indicate the nature of the abnormal operating condition.

Conventionally, however, the format of the system-fault indicating file is specific to each kind of server platform, and therefore the various error-log files and alert files from the different server platforms would be unable to be centrally managed by the network administrator. In other words, when any one of the server platforms in the network system has an abnormal operating condition, the network administrator has to check all the server platforms one by one to find the faulted one and then perform required maintenance work on the faulted server platform.

The foregoing practice, however, is quite laborious and time-consuming, making the network maintenance work quite inefficient. Moreover, in the event that an abnormal operating condition is unperceived by network administrators or users, the abnormal operating condition may continue to exist, causing unpredicted consequences or disastrous system failures.

SUMMARY OF THE INVENTION

It is therefore an objective of this invention to provide a cross-platform system-fault warning system and method for use with a cluster of various kinds of server platforms for generating a warning message in the event that any one of the server platforms has an abnormal operating condition so as to inform network administrators and users to take necessary maintenance or precautious actions.

The cross-platform system-fault warning system and method according to the invention utilizes a plurality of fault detection modules, each of which is integrated in one of the server platforms for detecting whether the associated one of the server platforms has an abnormal operating condition, and if yes, capable of generating and transferring a text-based system-fault indicating file to a warning-message database, which stores a mapping table of warning messages toward system-fault indicating files, and which is linked to all the fault detection modules to receive the system-fault indicating file and capable of retrieving the corresponding warning message mapped to the received system-fault indicating file. The warning-message database then transfers the retrieved warning message to a warning-message sender, such as an e-mail server, for transferring the warning message in e-mail via the network system to the workstations.

The cross-platform system-fault warning system and method according to the invention is capable of sending a warning message to all network administrators and users in the event of an abnormal operating condition in any one of the server platforms in a server cluster, so as to inform network administrators and users to take necessary maintenance or precautions actions. Since the warning message can indicate the nature of the abnormal operating condition and which one of the server platforms in the server cluster is faulted, it allows the network administrator to immediately pinpoint the faulted server platform, without having to check all the server platforms one by one as in the case of the prior art, and take necessary maintenance or precautious actions.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The cross-platform system-fault warning system and method according to the invention is disclosed in full details in the following with reference to FIG. 1 and FIG. 2.

Figure 1:
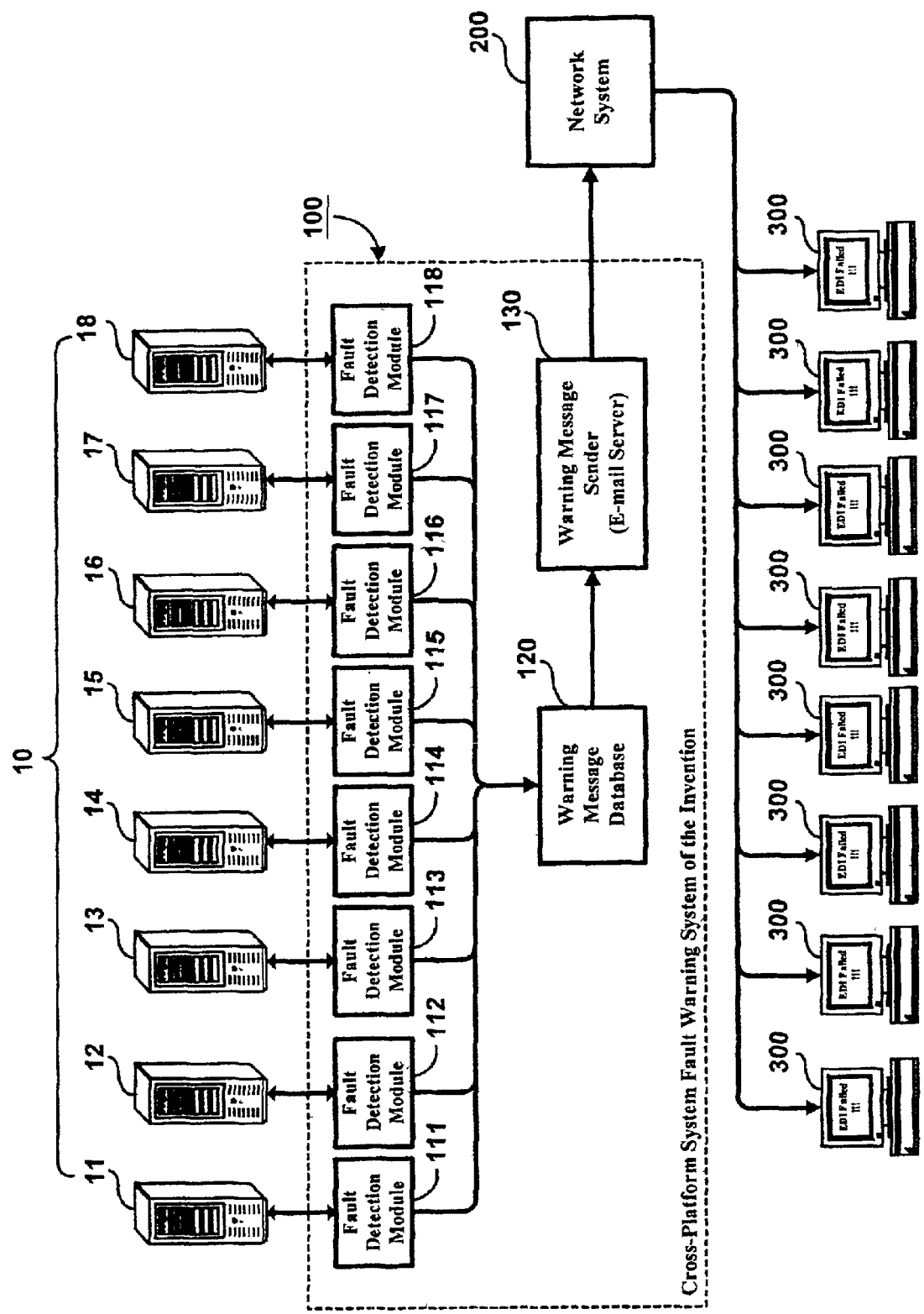
FIG. 1 is a schematic diagram showing the system architecture of the cross-platform system-fault warning system according to the invention.

Referring first to FIG. 1, the cross-platform system-fault warning system of the invention (as the part enclosed in the dashed box indicated by the reference numeral 100) is designed for use with a server cluster 10 of various kinds of server platforms, including, for example, an Oracle database server 11, a SQL (Structured Query Language) database server 12, a UNIX server 13, an AS/400 server 14, an I2 engine server 15, a SAP server 16, a Web server 17, and an EDI (Electronic Data Interchange) server 18.

The cross-platform system-fault warning system of the invention 100 is capable of detecting whether any one of these server platforms 11, 12, 13, 14, 15, 16, 17, 18 has an abnormal operating condition, such as program execution failure or insufficient hard disk space, and in the event of such condition, capable of generating a warning message and transferring it via a network system 200, such as Intranet or Internet, to all network administrators' and users' workstations 300 so as to inform these people to take necessary maintenance or precautious actions. This warning message is written in user-readable form and whose content indicates the nature of the abnormal operating condition and which one of the server platforms 11, 12, 13, 14, 15, 16, 17, 18 is under this abnormal operating condition.

The cross-platform system-fault warning system of the invention 100 comprises: (a) a plurality of fault detection modules 111, 112, 113, 114, 115, 116, 117, 118; (b) a warning-message database 120; and (c) a warning-message sender 130.

The fault detection modules 111, 112, 113, 114, 115, 116, 117, 118 are each integrated in one of the server platforms 11, 12, 13, 14, 15, 16, 17, 18 in the server cluster 10 for detecting whether its associated one of the server platforms 11, 12, 13, 14, 15, 16, 17, 18 has an abnormal operating condition, such as program execution failure or insufficient hard disk space, and in the event of such condition, generating a text-based system-fault indicating file, such as an error-log file or an alert file in text format, which is coded in a unique manner to indicate the nature of the abnormal operating condition and the type of the faulted server platform. This text-based system-fault indicating file is then transferred via a network file transfer protocol, such as FTP (File Transfer Protocol), to the warning-message database 120.

For instance, assume a program execution failure occurs in the UNIX server 13 in the server cluster 10, then the associated fault detection module 113 will automatically generate an error-log file in text format to indicate such an abnormal operating condition, and then transfer this text-based error-log file via FTP to the warning-message database 120.

In addition, assume a condition of insufficient hard disk space occurs in the Web server 17 in the server cluster 10, then the associated fault detection module 117 will automatically generate an alert file in text format to indicate such an abnormal operating condition, and then transfer this text-based alert file via FTP to the warning-message database 120.

The warning-message database 120 stores a mapping table of warning messages toward the text-based system-fault indicating files. These warning messages prestored in the warning-message database 120 are written in user-readable form and whose contents indicate the nature of each abnormal operating condition and which one of the server platforms 11, 12, 13, 14, 15, 16, 17, 18 is currently faulted. Upon receiving any system-fault indicating file from either one of the fault detection modules 111, 112, 113, 114, 115, 116, 117, 118, the warning-message database 120 will promptly retrieve the corresponding warning message mapped to the received system-fault indicating file, and then transfer the retrieved warning message to the warning-message sender 130.

The warning-message sender 130 can be, for example, an e-mail server, which is internally linked to the warning-message database 120 and externally linked to a network system 200, such as Internet or Intranet, that are also linked to all the system administrators' and users' workstations 300 linked to the server cluster 10. Upon receiving a warning message from the warning-message database 120, the warning-message sender 130 will promptly transfer the warning message, such as in e-mail, via the network system 200 to all the network administrators' and users' workstations 300.

Figure 2:
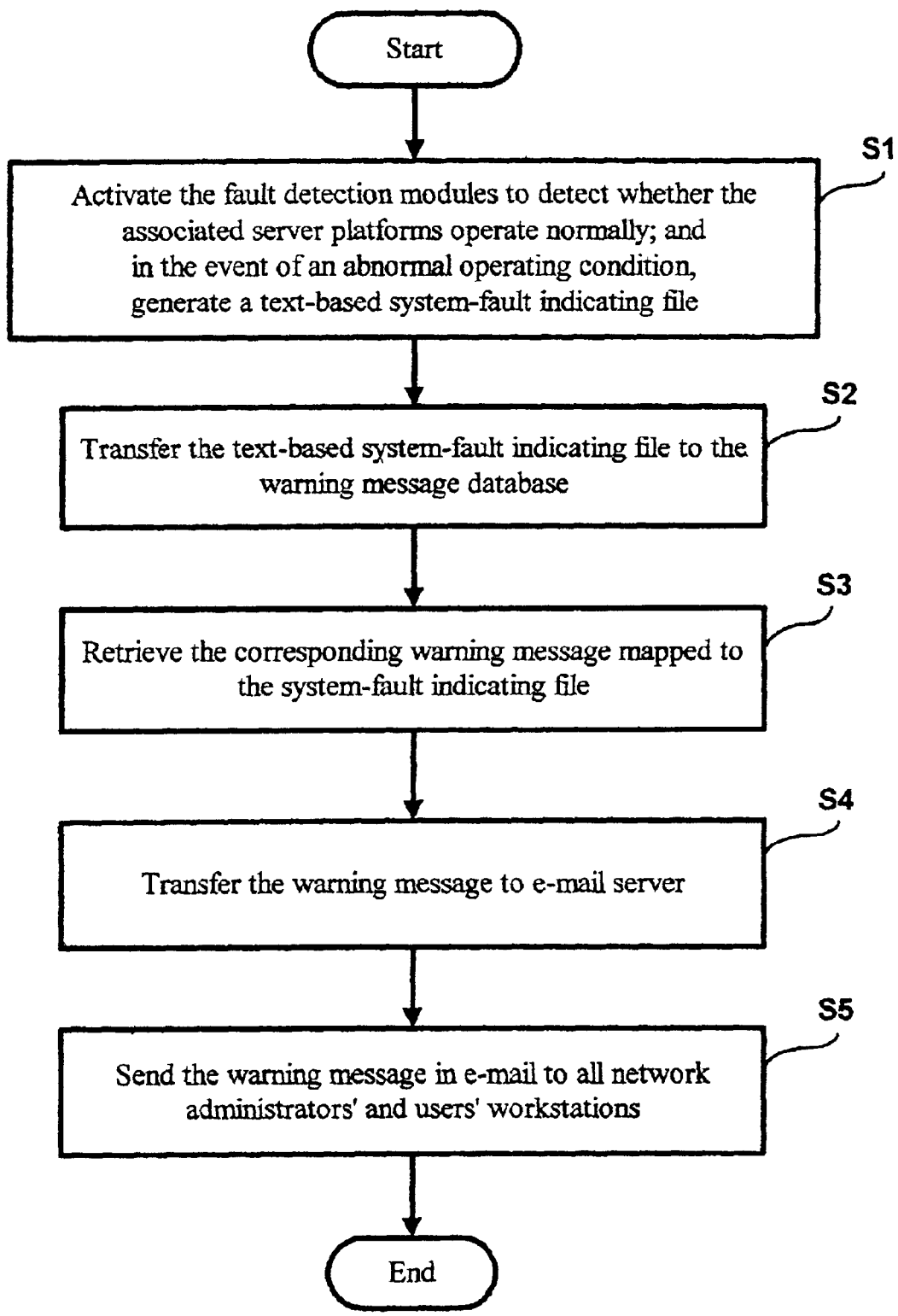
FIG. 2 is a flow diagram showing the operational procedural steps executed by the cross-platform system-fault warning system according to the invention.

FIG. 2 is a flow diagram showing the operational procedural steps executed by the cross-platform system-fault warning system of the invention 100.

In the first step S1, the fault detection modules 111, 112, 113, 114, 115, 116, 117, 118 are activated to detect the respective server platforms 11, 12, 13, 14, 15, 16, 17, 18 to check whether they operate normally; and in the event that any one of the server platforms 11, 12, 13, 14, 15, 16, 17, 18 has an abnormal operating condition, such as program execution failure or insufficient hard disk space, the associated one of the fault detection modules 111, 112, 113, 114, 115, 116, 117, 118 will promptly generate a text-based system-fault indicating file to indicate the nature of the abnormal operating condition.

In the next step S2, the text-based system-fault indicating file is transferred via FTP to the warning-message database 120.

In the next step S3, upon receiving the system-fault indicating file, the warning-message database 120 promptly retrieves the corresponding warning message from the mapping table. This warning message is written in user-readable form and whose content indicates the nature of the abnormal operating condition and which one of the server platforms 11, 12, 13, 14, 15, 16, 17, 18 is under this abnormal operating condition.

In the next step S4, the warning-message database 120 transfers the retrieved warning message to the warning-message sender 130.

In the next step S5, the warning-message sender 130 transfers the warning message in e-mail via the network system 200 to all the network administrators' and users' workstations 300, so as to inform all network administrators and users to take necessary maintenance or precautious actions.

In conclusion, the invention provides a cross-platform system-fault warning system and method, which is capable of sending a warning message to all network administrators and users in the event of an abnormal operating condition in any one of the server platforms, so as to inform network administrators and users to take necessary maintenance or precautious actions. Since this warning message is independent of the particular type of the server platform and can indicate the nature of the abnormal operating condition and which one of the server platforms in the server cluster has the abnormal operating condition, it allows the network administrator to immediately pinpoint the faulted server platform, without having to check all the server platforms one by one as in the case of the prior art, and take necessary maintenance or precautious actions.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A cross-platform system-fault warning method for use with a cluster of server platforms in a network system for generating a warning message to a plurality of workstations liking to these server platforms in the event of an abnormal operating condition in any one of the server platforms;

the cross-platform system-fault warning method comprising the step of:

(1) continually detecting whether any one of the server platforms has an abnormal operating condition; if yes, generating a text-based system-fault indicating file;

(2) transferring the text-based system-fault indicating file to a warning-message database, which stores a mapping table of warning messages toward text-based system-fault indicating files;

(3) from the warning-message database, retrieving a warning message corresponding to the system-fault indicating file; and (4) transferring the warning message retrieved from the warning-message database via the network system to the workstations.

2. The cross-platform system-fault warning method of claim 1, wherein in said step (2), the text-based system-fault indicating file is transferred via FTP to the warning-message database.

3. The cross-platform system-fault warning method of claim 1, wherein ins said step (4), the warning message is transferred in e-mail via the network system to the workstations.

4. A cross-platform system-fault warning system for use with a cluster of server platforms in a network system for generating a warning message to the workstations linking to these server platforms in the event of an abnormal operating condition in any one of the server platforms;

the cross-platform system-fault warning system comprising:

(a) a plurality of fault detection modules, each of which is integrated in one of the server platforms for detecting whether the associated one of the server platforms has an abnormal operating condition, and if yes, capable of generating a text-based system-fault indicating file;

(b) a warning-message database, which stores a mapping table of warning messages toward system-fault indicating files, and which is linked to all the fault detection modules to receive the system-fault indicating file and capable of retrieving the corresponding warning message mapped to the received system-fault indicating file; and (c) a warning-message sender, which is internally linked to the warning-message database and externally linked to the network system, for transferring the warning message via the network system to the workstations.

5. The cross-platform system-fault warning system of claim 4, wherein the system-fault indicating file is transferred via FTP to the warning-message database.

6. The cross-platform system-fault warning system of claim 4, wherein the warning-message sender is an e-mail server, which is capable of transferring the warning message in e-mail via the network system to the workstations.

7. A cross-platform system-fault warning system for use with a cluster of server platforms in a network system for generating a warning message to the workstations liking to these server platforms in the event of an abnormal operating condition in any one of the server platforms;

the cross-platform system-fault warning system comprising:

(a) a plurality of fault detection modules, each of which is integrated in one of the server platforms for detecting whether the associated one of the server platforms has an abnormal operating condition, and if yes, capable of generating a text-based system-fault indicating file;

(b) a warning-message database, which stores a mapping table of warning messages toward system-fault indicating files, and which is linked to all the fault detection modules to receive the system-fault indicating file and capable of retrieving the corresponding warning message mapped to the received system-fault indicating file; and (c) an e-mail server, which is internally linked to the warning-message database and externally linked to the network system, for transferring the warning message in e-mail via the network system to the workstations.

8. The cross-platform system-fault warning system of claim 7, wherein the system-fault indicating file is transferred via FTP to the warning-message database.

* * * * *